United States Patent [19]

Inagawa et al.

[11] Patent Number: 5,251,718
[45] Date of Patent: Oct. 12, 1993

[54] WIND LEADING SYSTEM FOR SNOWMOBILE

[75] Inventors: Hiroyuki Inagawa; Takashi Yamamura, both of Iwata, Japan

[73] Assignee: Yamaha Hatsudoki Kabushiki Kaisha, Iwata, Japan

[21] Appl. No.: 820,324

[22] Filed: Jan. 13, 1992

[30] Foreign Application Priority Data

Jan. 16, 1991 [JP] Japan .................................. 3-17073

[51] Int. Cl.$^5$ ............................................ B62D 27/00
[52] U.S. Cl. .................................... 180/190; 180/68.2
[58] Field of Search ..................... 180/68.1, 68.4, 182, 180/190, 68.2, 68.6

[56] References Cited

U.S. PATENT DOCUMENTS

| 4,008,777 | 2/1977 | Juto et al. | 180/182 |
| 4,249,626 | 2/1981 | Fields et al. | 180/182 X |
| 5,129,473 | 7/1992 | Boyer | 180/68.4 X |

FOREIGN PATENT DOCUMENTS 3831792  3/1990  Fed. Rep. of Germany ..... 180/68.1

Primary Examiner—Robert J. Oberleitner
Assistant Examiner—Victor E. Johnson
Attorney, Agent, or Firm—Ernest A. Beutler

[57] ABSTRACT

A snowmobile having an improved cooling arrangement including a front mounted radiator and a ducting system for ducting cooling air through the radiator and away from the windshield and rider's hands on the handlebars of the snowmobile.

5 Claims, 11 Drawing Sheets

WIND LEADING SYSTEM FOR SNOWMOBILE

BACKGROUND OF THE INVENTION

This invention relates to a wind leading system for a snowmobile and more particularly to an arrangement for guiding the flow of cooling air across the radiator of a snowmobile and away from the rider and windshield.

Many forms of snowmobiles are powered by water cooled internal combustion engines Because of the configuration of the snowmobile, the engine compartment is positioned ahead of the rider and windshield and the radiator for exchanging heat from the engine coolant is normally positioned either to the front of or above the powering engine. Of course, it is necessary to provide an arrangement for drawing atmospheric air and passing it across the radiator to cool the coolant before it is returned to the engine. The air that has passed across the radiator must then be discharged back to the atmosphere. It is not desirable to discharge this air into the engine compartment because it is very heavily laden with moisture and the moisture can cause corrosion and other problems to the engine if the water is accumulated in the engine compartment. Therefore, it has been the practice to duct the air that flows through the radiator externally and in a position forward of the rider and the windshield.

This type of flow arrangement, has numerous disadvantages. In the first instance, because of the fact that the air that has passed through the rad contains a large amount of water vapor and is at a somewhat e temperature, if this water laden air impacts the windshield, which will be at a much lower temperature, condensation or freezing may occur. Obviously, this will obstruct the vision of the rider.

In addition, the water laden air will be directed around the windshield and on the hands of the rider since the handlebars for steering the snowmobile are normally positioned at an elevated position to the rear of the windshield and frequently extend transversely outwardly beyond the peripheral edges of the windshield. The rider's hands, although gloved, will be impacted by this moisture laden air and this will also cause a substantial chill to the rider's hands.

It is, therefore, a principal object of this invention to provide an improved arrangement for ducting the air through the radiator of a small snowmobile and away from the windshield and rider.

It is further object of this invention to provide improved wind directing system for a snowmobile wherein the air flow will be directed away from the rider and windshield.

SUMMARY OF THE INVENTION

This invention is adapted to be embodied in a snowmobile having a body containing a driving track and a rider's seat positioned over the driving track and to the rear of the body of the snowmobile. A steering handlebar assembly is disposed forwardly of the seat for steering at least one dirigible front ski carried by the body. A water cooled internal combustion engine is positioned within the body forwardly of the seat and the handlebars for driving the drive track. A radiator for exchanging heat from the coolant of the engine is disposed in the forward portion of the body and within the body. Air inlet ducts are positioned in the body forwardly of the radiator for permitting the flow of atmospheric air into the body and across the radiator. A windshield is positioned forwardly of the handlebar assembly and rearwardly of the radiator. Ducting means are formed in the body for directing the air flowing through the radiator away from the handlebar and the windshield so that water laden air passing through the radiator will not impact upon the rider's hands or on the windshield.

DETAILED DESCRIPTION OF THE PREFERRED EMBODIMENT OF THE INVENTION

Figure 1:
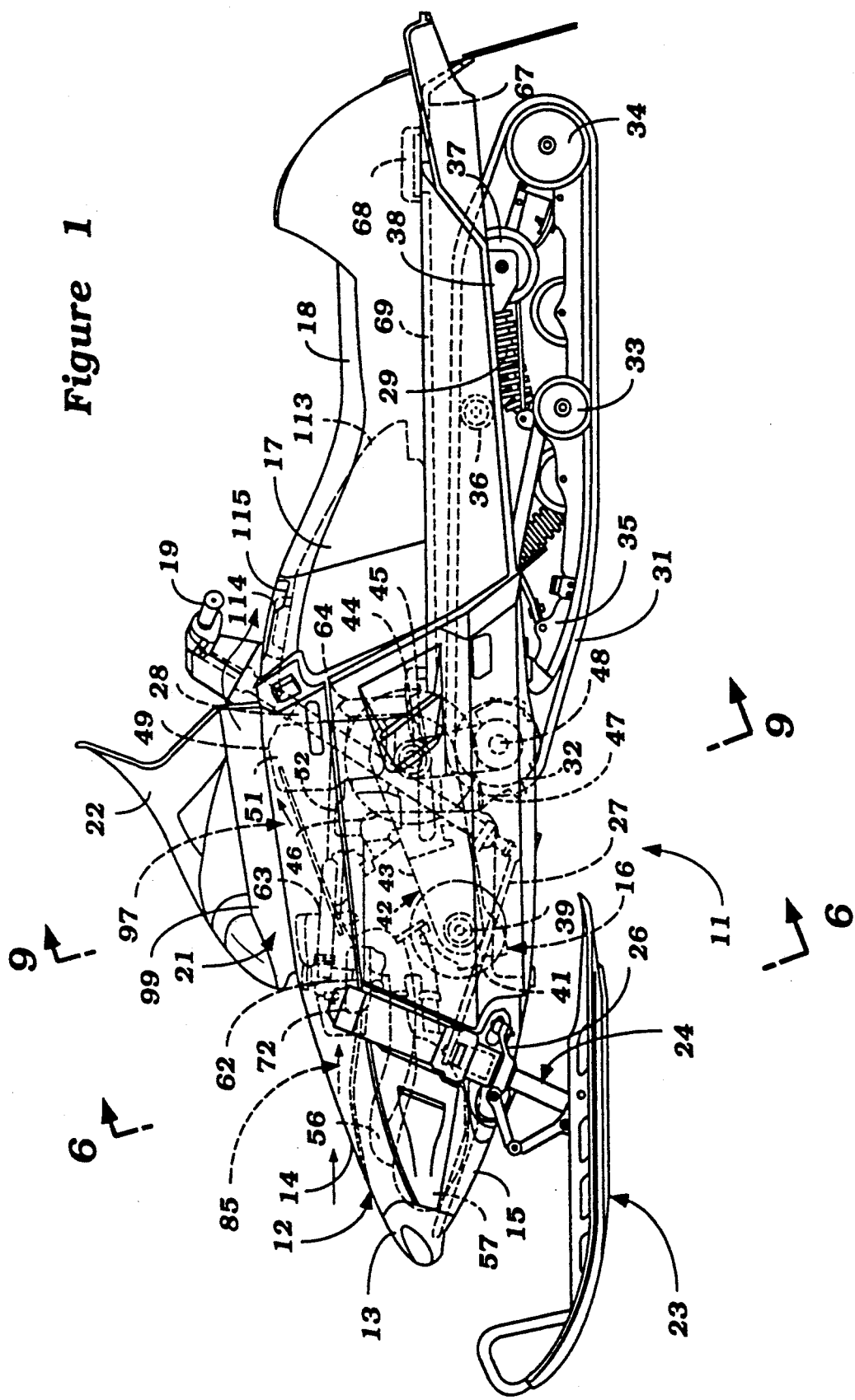
FIG. 1 is a side elevational view of a snowmobile constructed in accordance with an embodiment of the invention.
Figure 2:
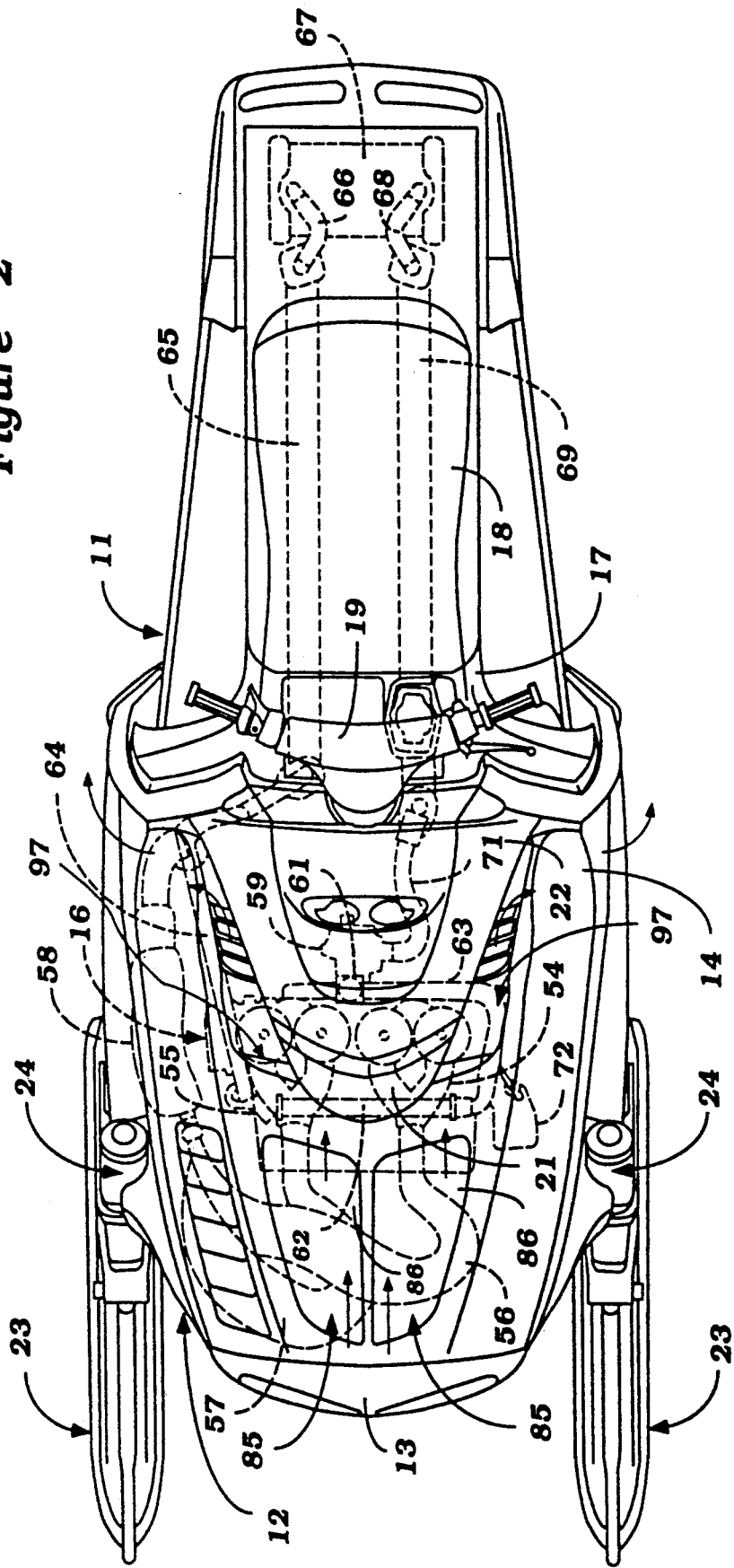
FIG. 2 is a top plan view of the snowmobile.
Figure 3:
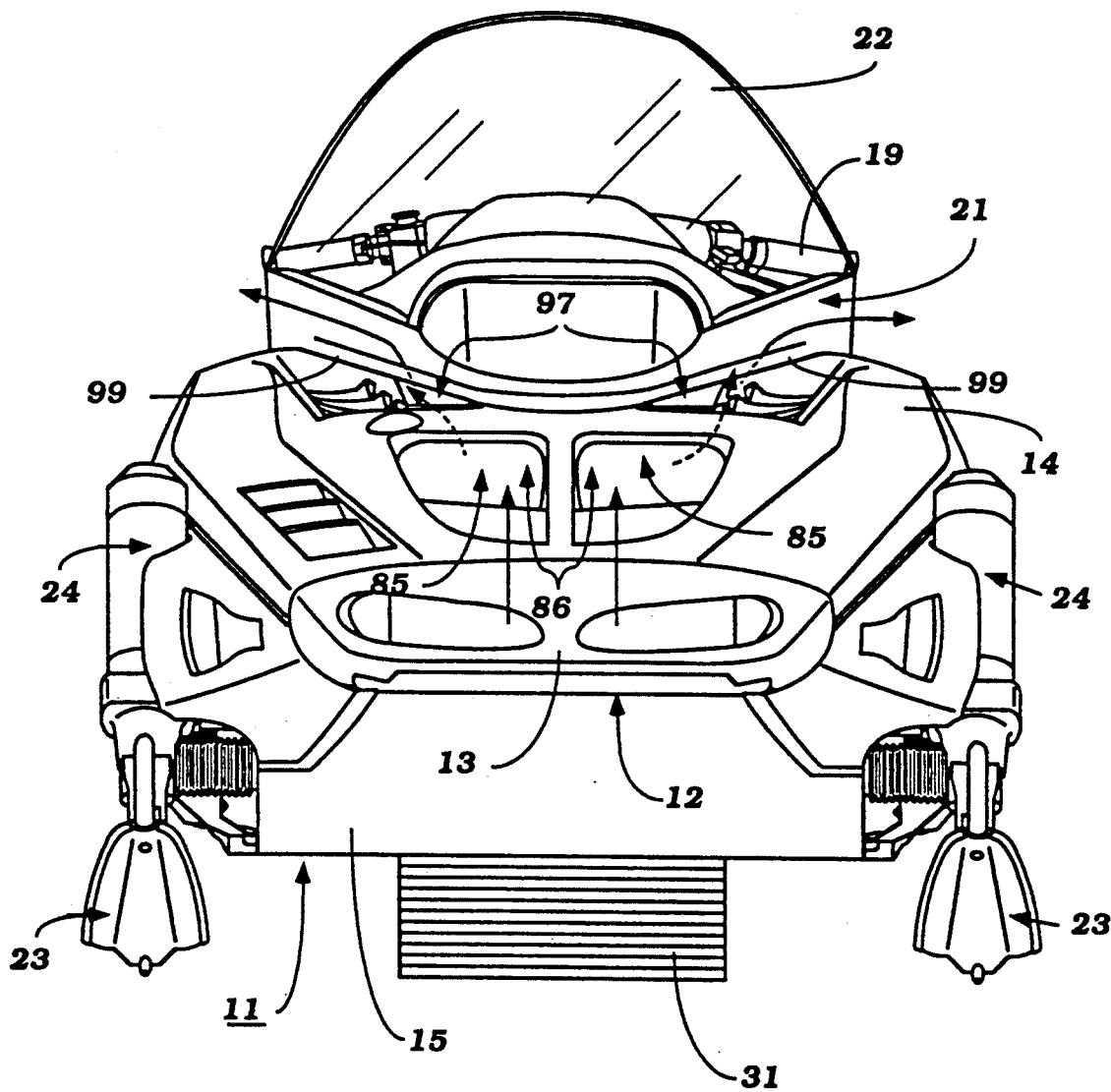
FIG. 3 is an enlarged front elevational view of the snowmobile.

Referring first to FIGS. 1-3, a snowmobile constructed in accordance with an embodiment of the invention is identified generally by the reference numeral 11. The snowmobile includes a body assembly 12 made up of a number of parts which may be formed from suitable materials and which includes a nose piece 13 an upper engine cowling 14 and a lower tray 15 which together define an engine compartment in which a powering internal combustion engine, indicated generally by the reference numeral 16 is positioned.

In the illustrated embodiment, the engine 16 is of the inline four cylinder type operating on a two cycle crankcase compression principal. Although the engine 16 is described as being a four cylinder inline engine, the engine 16 is, in fact, comprised of two, two cylinder inline engines joined end to end. It is to be understood that the invention may be employed with engines of other types.

The body 12 further includes a rear body portion 17 that accommodates a seat 18 adapted to seat one or more riders seated in straddle fashion. A handlebar assembly 19 is positioned forwardly of the seat 18 for steering of the snowmobile, in a manner which will be described.

There is provided further an upper cowling portion, indicated generally at 21, which may be removable to access the engine compartment and which carries an upper windshield 22 that is disposed forwardly of the handlebar assembly 19 for affording protection to the riders seated on the seat 18.

A pair of front skis 23 having a construction to be described are supported in a manner also to be described at the forward portion of the body 12 by means of suspension struts 24 which also accommodate steering movement of the skis 23. The struts 24 are interconnected by means of a tie rod 25 so that they may be steered in unison and one of the skis 24 is provided with a steering link 26 which is connected to a steering rod 27 which is, in turn, operated by a steering column 28 that is coupled to the aforementioned handlebar assembly 19.

Rearwardly of the front skis 25, and beneath the seat 18, the body 12 suspends a carriage assembly, indicated generally by the reference numeral 29 by a suitable suspension system and which carriage assembly 29 supports a drive belt, indicated at 31. The drive belt 31 is trained around a driving sprocket 32, which is driven in a manner to be described, and idler sprockets 33 and 34 that are mounted on a pair of rail's 35 of the carriage 29. In addition, further idler rolls 36 and 37 are carried by the carriage 29 and engage the drive belt 31 so as to confine and direct its path of movement. The rear idler wheels 37 are suitable manner.

The engine 16 is disposed transversely in the engine compartment and its output shaft drives a belt driveshaft 39 in a manner which will also be described and which belt driveshaft 39 extends transversely to the longitudinal center line of the snowmobile 12 as does the crankshaft or output shaft of the engine 16. This belt driveshaft 39 drives a variable pulley 41 of a variable speed pulley drive mechanism indicated generally by the reference numeral 42. This drive pulley 41 drives a belt 43 which, in turn, drives a driven variable pulley 44 which is affixed to an intermediate shaft 45. The intermediate shaft 45 has affixed to it a sprocket 46 which drives a drive belt 47 which is, in turn, trained around a sprocket that is affixed to a shaft 48 which is also coupled to the belt drive sprocket 32.

The construction of the engine 16 and the drive for the variable pulley 41 and its construction is of the type described in the co-pending application entitled Power Transmission System for Snowmobile, Ser. No. 07/820,326, filed concurrently herewith and assigned to the Assignee hereof, which disclosure is incorporated herein by reference. Basically and has been noted, the engine 16 is of the four cylinder inline type but is actually made up of two inline two cylinder engines connected end to end. The engine 16 also operates on a two stroke crankcase compression principal and as is typical of two cycle crankcase compression engines, the crankcase chamber of the engine 16 is divided into individual chambers each of which are sealed from each others and each of which is associated with a respective one of the engine cylinder bores.

An intake charge is delivered to the crankcase chambers from an induction system which is identified generally by the reference numeral 49 (FIGS. 1 and 4) and which is described in more detail in the co-pending application entitled Induction System For Snowmobile, Ser. No. 07/820,325, now U.S. Pat. No. 5,174,258, filed concurrently herewith and which is assigned to the Assignee of this application the disclosure of which is incorporated herein by reference. Briefly, the induction system 49 includes a pair of air boxes 51 to which atmospheric air is admitted and which is filtered in a manner described in application Ser. No. 07/820,325 and then delivered to a pair of carburetors 52. The carburetors 52 communicate with a manifold 53 that then supplies air to a respective inlet port formed in the respective cylinder block and in which a reed type check valve is provided so as to permit flow into the individual crankcase chambers but not in the opposite direction when the charge is compressed by the downward movement of the pistons.

As is noted in the co-pending application Ser. No. 07/820,325, the charge admitted to the crankcase chambers of the cylinder blocks of the engine as transferred through scavenge ports to the combustion chamber then fired by an ignition system of the type described therein and exhausted through exhaust ports also formed in the individual cylinder blocks. As is noted in the co-pending application Ser. No. 07/820,325, the firing order of the engine 16 and firing timing is such that no two cylinders fire at the same time and the cylinders of each cylinder block fire at 180 degrees from each other. The cylinders of one cylinder block also fire at 90 degrees from the corresponding cylinders of the other cylinder block. The reasons for this will become apparent.

The exhaust ports open through the forward side of the cylinder blocks and communicate with an exhaust system of the type described in more detail in the co-pending application entitled Exhaust System For Snowmobile, Ser. No. 07/820,327, filed on the same day as this application and assigned to the Assignee hereof. The disclosure of that application is incorporated herein by reference. Briefly, the exhaust system (FIGS. 1 and 2) comprises a first paired exhaust manifold 54 having two inlets and a common outlet (FIGS. 1 and 2). Because the cylinders of this cylinder block fire at 180 degrees from each other, the firing pulses in the paired manifold 54 will not cause any adverse effects since the exhaust pulses from one exhaust port will not reflect back to the other at any time when it is open to any significant amount. In a similar manner, the exhaust ports of the other cylinder block also communicate with a paired manifold 55 and again since these cylinders fire at 180 degrees from each other, the pairing of the exhaust ports will have no adverse effects. A pair of exhaust pipes 56 and 57 extend from the manifolds 54 and 55, respectively and terminate at separate inlets to in a common expansion chamber, silencer 58 positioned at one side of the snowmobile 11 and at one end of the engine 16. Again, because of the fact that the cylinders fire at 90 degrees from each other, their common communication with a single silencing device 58 will not provide any adverse effect of exhaust gas pulses traveling back through the exhaust system to the individual exhaust ports. The exhaust silencer 58 has a common atmospheric exhaust outlet.

As has been noted, the engine 16 is liquid cooled and to this end its cylinder blocks and cylinder heads are provided with cooling jackets which communicate with each other. The cooling system for the engine 16 and the manner in which water is circulated through it is described in more detail in the co-pending application entitled Cooling System For Snowmobile, Ser. No. 07/820,328, now U.S. Pat. No. 5,152,255, filed concurrently herewith and assigned to the Assignee hereof now issued as U.S. Pat. No. 5,152,255 on Oct. 6, 1992, the disclosure of which is incorporated herein by reference. Briefly, however, this cooling system includes passages that extend through the crankcase chambers from the rear side of the engine 16 to the front side of it for delivering coolant to the cylinder block cooling jackets and, at the same time, cooling the crankcase chambers. This coolant is circulated by coolant pump 59 (FIGS. 2, 5, 7, and 8) that is positioned on the rear side of the engine and which is driven in a manner as described in the aforenoted co-pending application Ser. No. 07/820,328.

A thermostat assembly 61 is positioned on the intake side of the cylinder head cooling jackets and circulates the coolant back to the heat exchanger system which will now be described by particular reference to FIGS. 1, 2 and 4-8. Basically this heat exchanger system includes a cross flow radiator 62 that is disposed generally above the engine and specifically above the exhaust manifolds 54 and 55. A conduit 63 communicates the thermostat 61 with the left hand side of the cross flow radiator 62. Coolant is then delivered from the other side of the cross flow radiator 62 to a conduit 64 that extends along the right side of the snowmobile and which then curves inwardly to communicate with a longitudinally extending heat exchanger 65 that extends along one side of the underside of the seat 18. The seat 18 is constructed and configured so that air can flow across the heat exchanger 65 for its cooling but some heat will also be transferred to the seat 18 so as to warm the riders.

At the rear end of the seat 18, the heat exchanger 65 communicates with a conduit 66 that supplies coolant to a further transversely extending heat exchanger 67. The heat exchanger 67 then communicates with a conduit 68 which delivers the coolant to a further longitudinally extending heat exchanger 69 which extends parallel to the heat exchanger 65 on the other side of the seat 18. The heat exchanger 69 communicates at its forward end with a conduit 71 that delivers the coolant to the coolant pump 59. The cooling system is also provided with an expansion tank 72 that accommodates for changes in volume of the coolant due to changes in its temperature. A conduit 73 connects the radiator 62 with this expansion tank 72.

Figure 8:
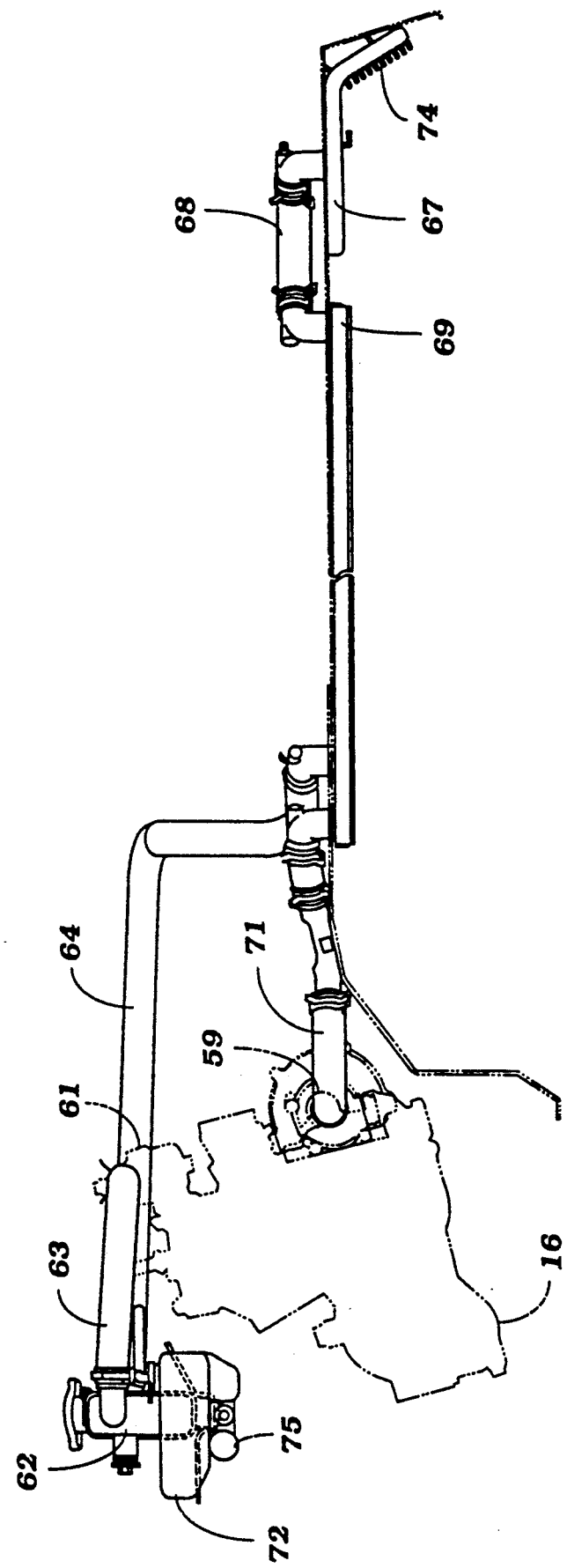
FIG. 8 is a side elevational view of the cooling system components shown in FIG. 8.
Figure 9:
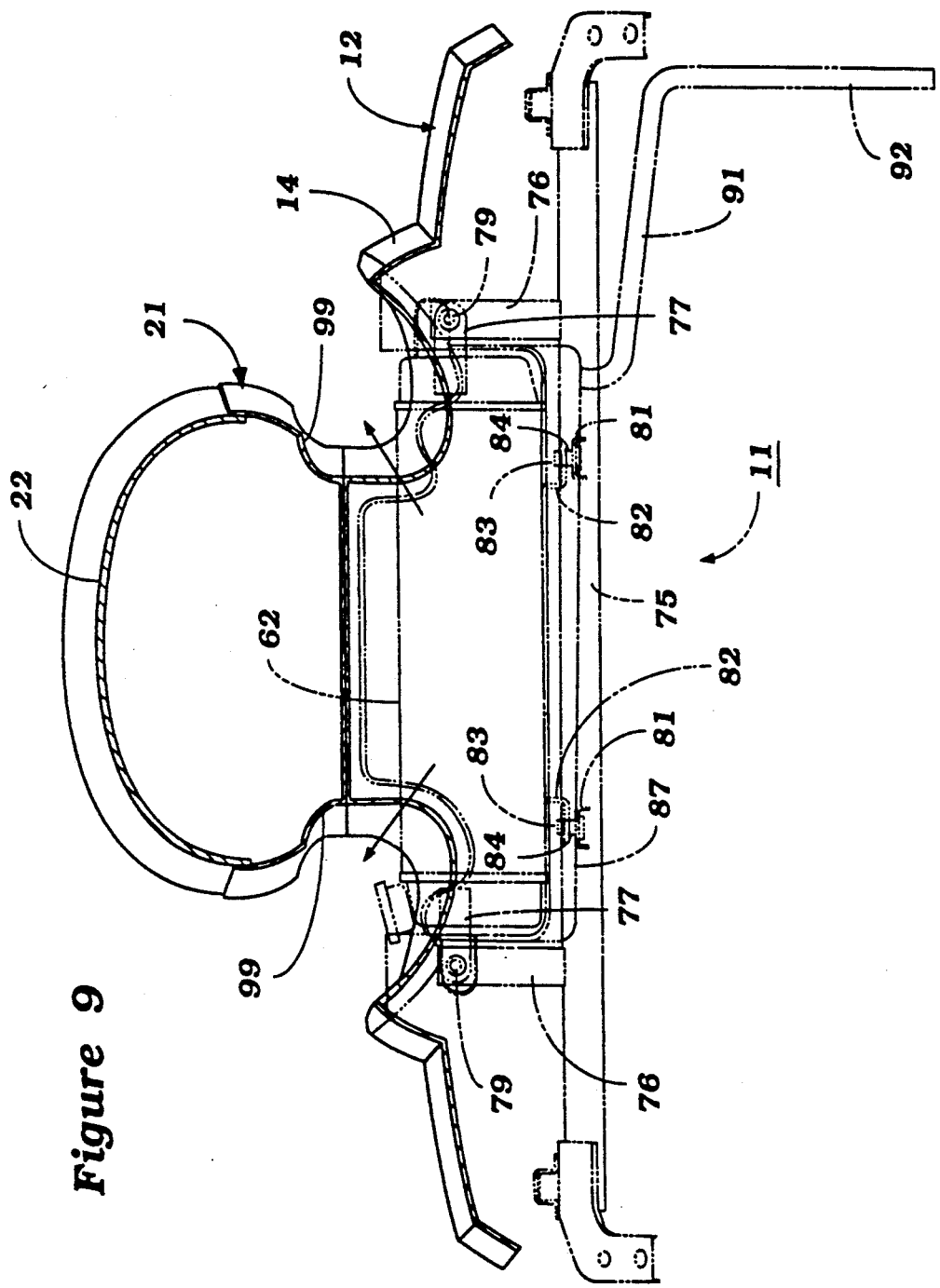
FIG. 9 is a cross sectional view taken along the line 9—9 of FIG. 1.

The heat exchangers 65, 67 and 69 may formed as aluminum extrusions and are suitably finned, the finning for the heat exchanger 67 being shown partially at 74 in FIG. 8. These heat exchangers 65, 67 and 69 receive cooling air that is actually circulated by the motion of the drive belt 31.

The mounting arrangement for the radiator 62 and the way in which the air is ducted across it for cooling purposes will now be described by particular reference to FIGS. 4 through 9. It should be noted that the snowmobile body 12 is provided with a reinforcing cross member 75 that extends between its opposite sides. This cross member has a pair of upstanding side stays 76 affixed to it which span the opposite sides of the radiator 62 and to which the radiator 62 is affixed by means of respective mounting brackets 77, elastic isolators 78 and a bolt and nut assembly 79.

The cross member 75 further has a pair of mounting brackets 81 affixed to it between the upstanding stays 76. The underside of the radiator 62 has corresponding mounting brackets 82 which are affixed to the brackets 81 by means of bolt and nut assemblies 83 and elastic isolators 84.

Cooling atmospheric air for the radiator 62 is drawn from a pair of nostril like air inlet openings 85 formed in the front of the body 12 and specifically the upper cowl portion 14 thereof (FIGS. 1 through 6). These inlet openings are defined by downwardly turned portions 86 of the body which direct the air flow rearwardly across the radiator 62 as shown by the arrows in the various figures. These portions 86 terminate forwardly of the radiator 62 and a drain plate 87, which is fixed to the radiator 62 in a manner to be described, extends under the trailing edge of these body portions 86 and carries an elastic seal 88 which provides sealing engagement so as to form a continuous air flow path back through the radiator 62.

Beneath the radiator 62, the drain plate 87 is formed with a depressed well section 89 that will accumulate any water which may condense in the air inlet system as thus far described. A drain tube 91 extends from the well 89 and has a lower end 92 that terminates beneath the engine compartment so that any condensed water will be discharged away from the engine 16 and not cause corrosion problems.

The drain plate 87 is affixed to the radiator 62 by means of mounting flanges 93 that are held by the fasteners 96 which support the radiator 62 on the frame stays 76.

The rear end of the drain plate 87, indicated generally by the reference numeral 94 carries a further seal 95 that engages downwardly extending portions 96 of the body member 14 which, in turn, define a pair of side air exit ducts 97. These ducts 97 are further defined by downwardly turned flanges 98 of the body portion 14.

It should be noted that the outlet ducts 97 are positioned on opposite sides of the upper cowl portion 21. As has been previously noted, there is a problem in letting the air that passes through the radiator 62 impinge upon the windshield 22 where it might condense or even freeze or on the handlebar assemblies 19 where the rider's hands might be chilled.

In accordance with the invention, the outlet ducts 97 are disposed rearwardly of the leading edge of the windshield 22 and on opposite sides thereof. Furthermore, these ducts 97 pass beneath recesses 99 formed in the upper cowl member 22 which define a pair of generally curved air flow ducts which extend rearwardly from the outlet ducts 97 and which diverge so that the air flow will be turned away from not only the windshield 22 but also the handlebar assembly 19. In this way, the ducting of the air through the radiator 62 and its discharge is such that adequate cooling air flow will be possible for the radiator 62 without causing fogging or condensation on the windshield 22 or cooling of the rider's hands on the handlebar 19.

Figure 10:
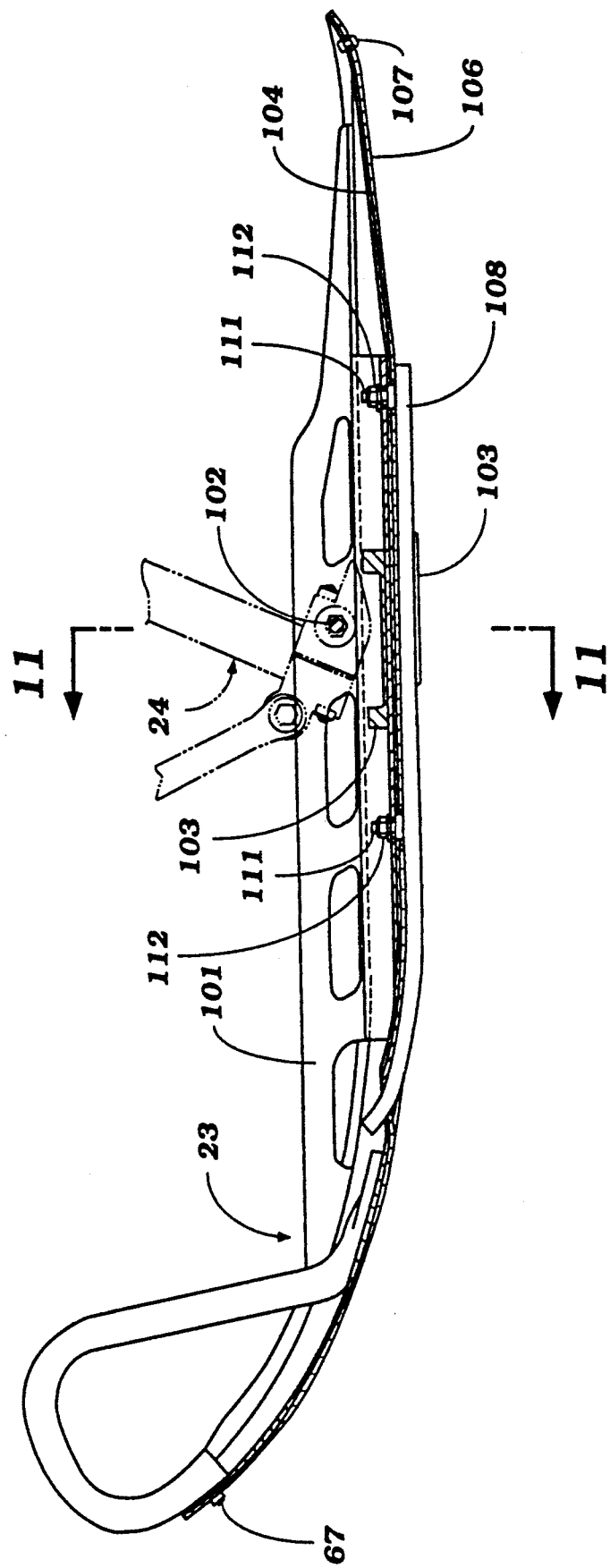
FIG. 10 is an enlarged side elevational view of one of the front skis, with a portion broken away so as to more clearly show the construction.
Figure 11:
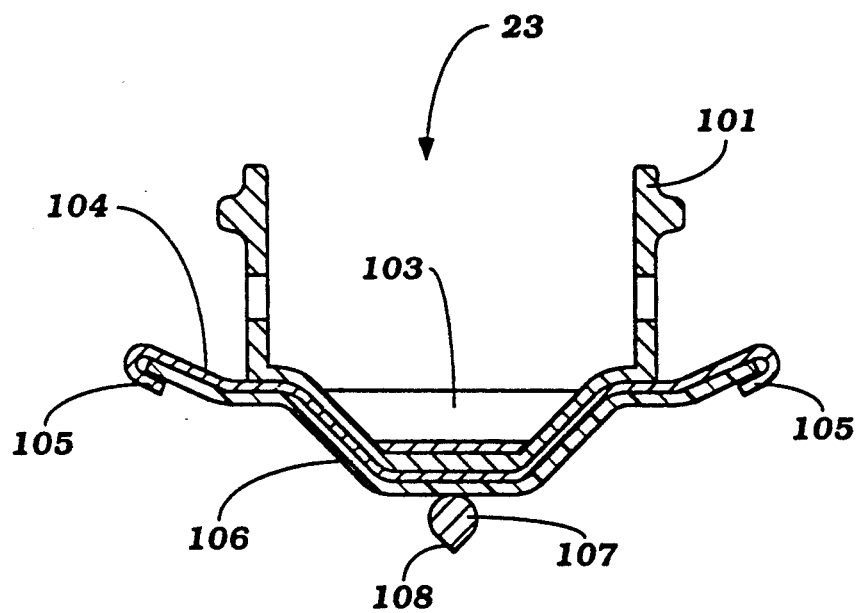
FIG. 11 is a cross sectional view taken along the line 11—11 of FIG. 10.

The construction of the steering skis 23 will now be described by particular reference to FIGS. 10 and 11. Each ski 23 is comprised of a generally channel shape upper member 101 having a pair of spaced apart legs that are connected to the lower end of the strut 24 by means of pivot pins 102. An elastic block 103 is fixed between these upstanding legs and limits the relative pivotal movement of the ski 23 relative to the strut 24.

A generally V shaped lower member 104, which may be formed from a relatively robust material such as aluminum or iron is affixed in a suitable manner to the upper member 101 and has a pair of peripheral flanges 105 on its lower surface. A replaceable lower ski strip 106 formed from a low friction high strength material such as a very high molecular weight polyethylene is received within the channels 105 and is held to the upper ski assembly by means of studs 107 and nuts 108 so as to be readily replaceable is worn.

Affixed in a suitable manner to the underside of the ski insert 106 is a rod like runner 108 having a sharpened lower edge 109 that is designed to contact the body of snow or ice on which the snowmobile 11 is operating. The runner 108 has affixed to it a pair of studs 111 that extend through suitable openings in the replaceable ski strip 106 and also the lower member 104. Nuts 112 hold the strip 108 and the wear strip 106 to this lower member 104. Because of the foregoing construction with respect to the construction of the skis 23, if the ski insert 106 or runner 108 become damaged, they can be easily replaced by removing the nuts 112 and rivets 107. This permits a lower cost replacement and less costly servicing.

Figure 4:
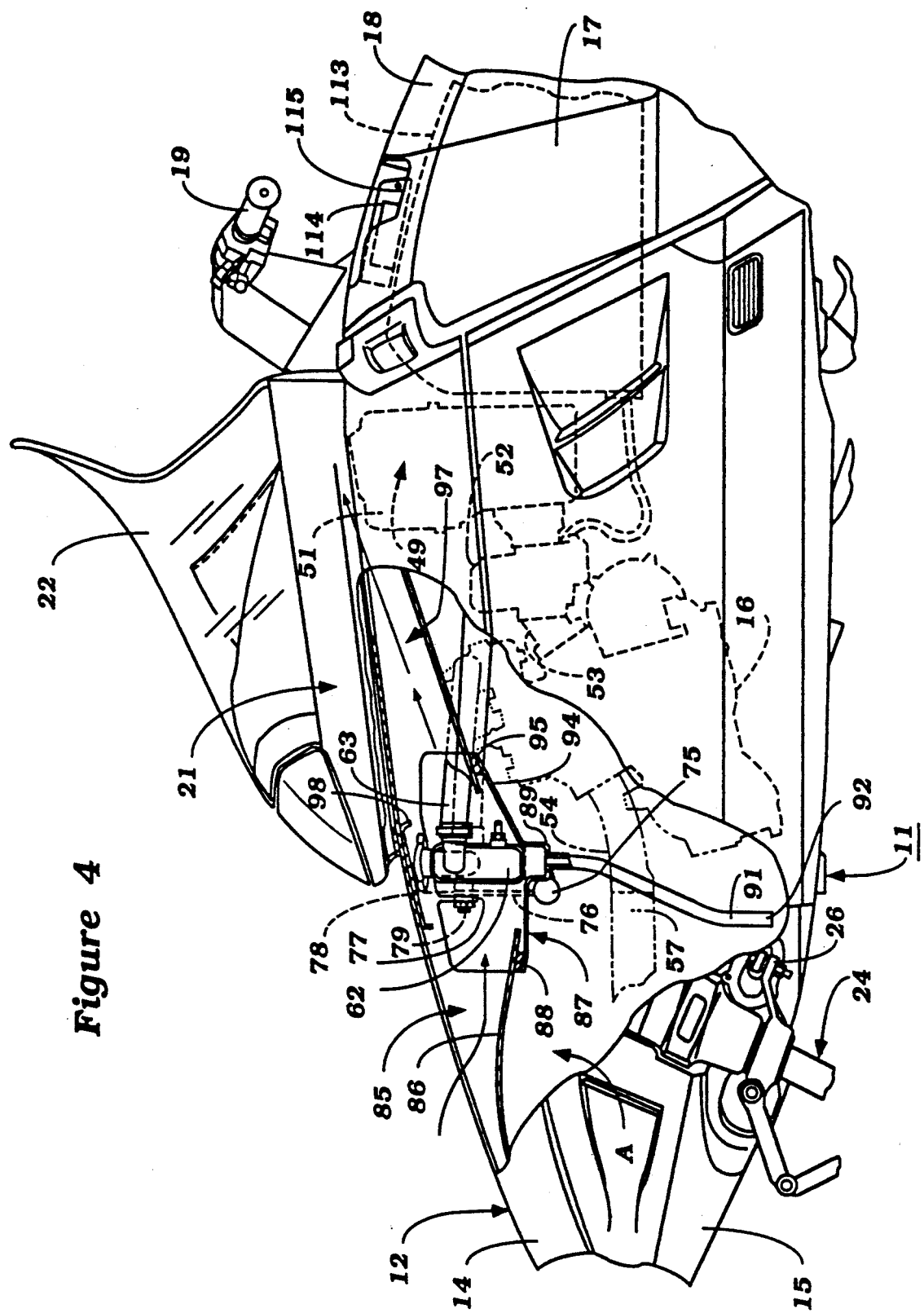
FIG. 4 is an enlarged side elevational view of the engine compartment portion of the snowmobile with a portion broken away to show the inlet air system and its relationship to the radiator.
Figure 5:
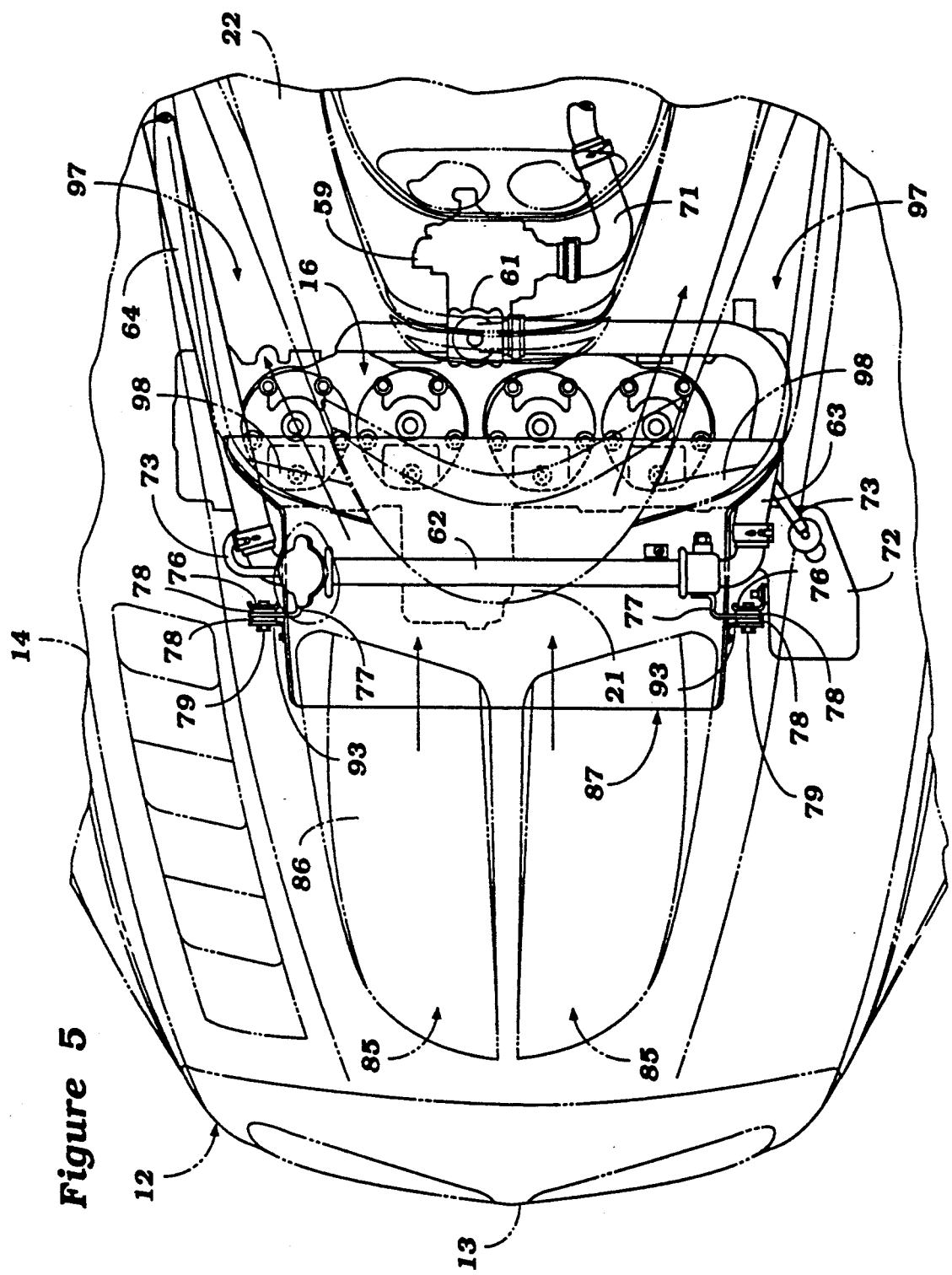
FIG. 5 is a top plan view of the portion of the snowmobile shown in FIG. 4 with the body shown in phantom.
Figure 6:
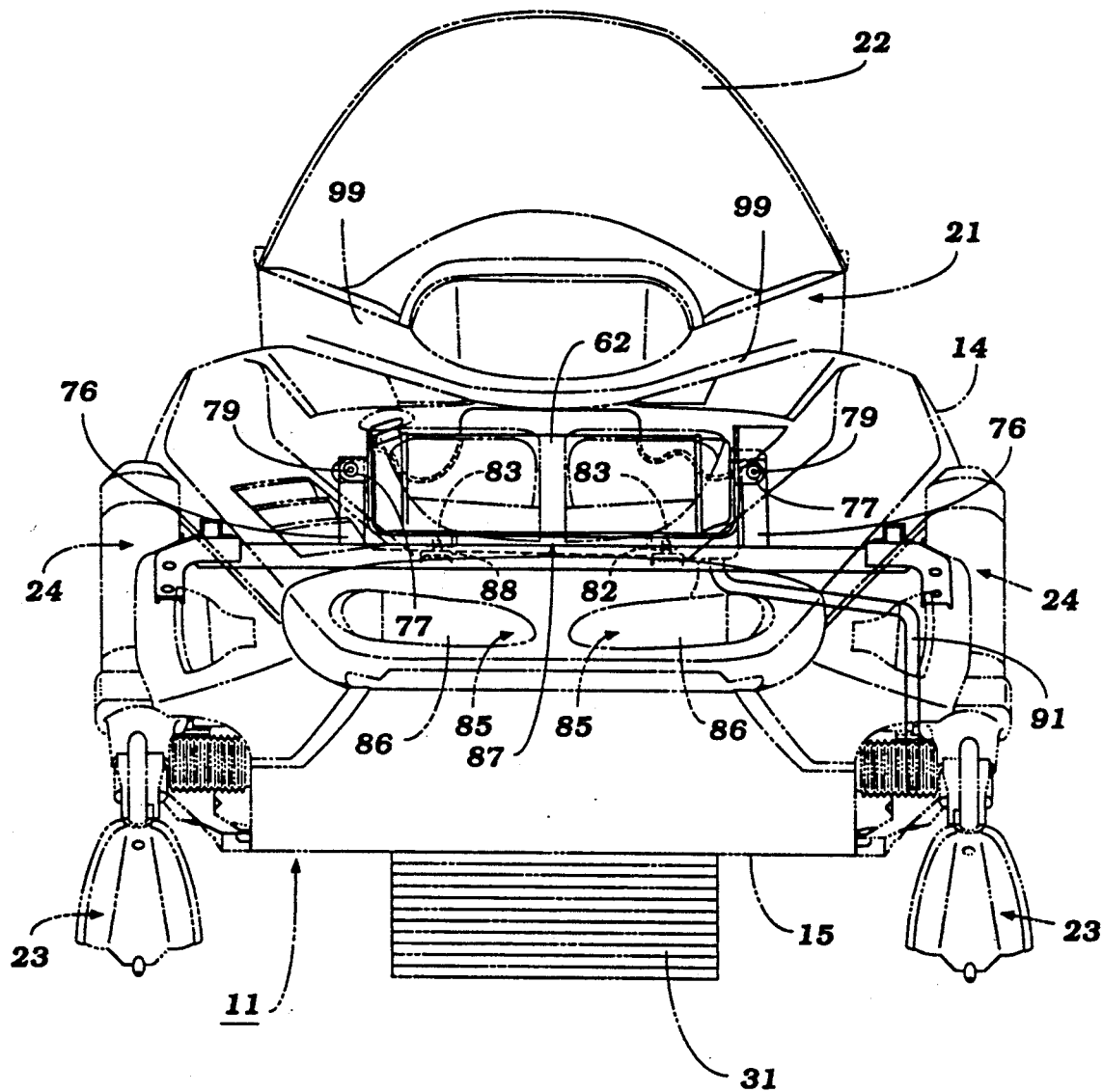
FIG. 6 is a cross sectional view taken along the line 6—6 of FIG. 1 with the body shown in phantom so as to more clearly illustrate the relationship of the radiator to the body.
Figure 7:
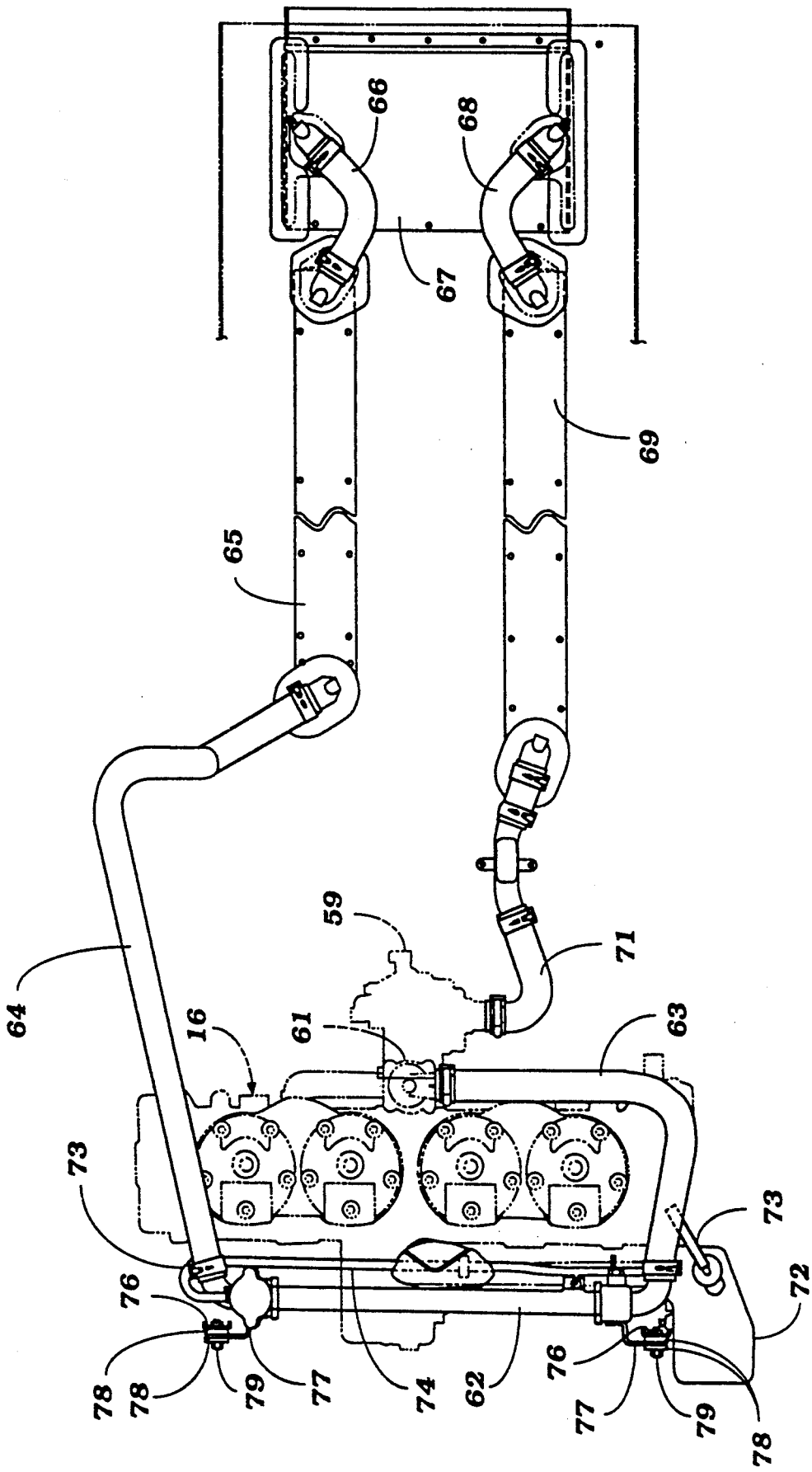
FIG. 7 is a top plan view showing the cooling system for the engine with the associated heat exchangers and radiator.

A fuel tank 113 is positioned in part beneath the seat 18 and has a fill neck 114 which extends forwardly of it for supplying fuel to the carburetors 52 (FIGS. 1 and 4). An access panel 115 is provided in the body portion 17 for permitting filling of this fuel tank.

It should be readily apparent from the foregoing description that the described snowmobile construction permits very good cooling of the engine by permitting copious air flow across its radiator while at the same time avoiding fogging or frosting of the windshield or chilling of the rider's hands. Of course, the foregoing description is that of a preferred embodiment of the invention and various changes and modifications may be made without departing from the spirit and scope of the invention as defined by the appended claims.

We claim:

1. A snowmobile having a body carrying a seat at a rear end thereof, a drive belt suspended beneath said seat, a handlebar assembly positioned forwardly of said seat for steering of said snowmobile by at least one dirigible ski mounted at a front portion of said body, an engine compartment positioned forwardly of said seat, a windshield having a base carried by said body forwardly of said seat and said handlebar assembly, a water cooled internal combustion engine contained within said engine compartment for driving said drive belt, a radiator for receiving coolant from said engine, said radiator being positioned within said body at a forward portion thereof, an air inlet opening formed in said body forwardly of said radiator for directing air flow through said radiator, and outlet duct means for ducting the air exiting said radiator along the base of said windshield and rearward and outwardly away from said windshield and said handlebar assembly wherein the outlet duct means comprises a pair of outlet ducts formed by recesses in the body on opposite sides of the base of the windshield.

2. A snowmobile as set forth in claim 1 wherein the radiator is mounted above the engine in the engine compartment.

3. A snowmobile as set forth in claim 2 wherein the inlet means comprises a pair of inlet ducts formed in the upper portion of the body forwardly of the radiator.

4. A snowmobile as set forth in claim 3 wherein the outlet ducts are formed on the sides of the base of the windshield.

5. A snowmobile as set forth in claim 4 wherein the body with a pair of diverging flow channels beneath the windshield and above the outlet ducts for directing the flow from the outlet ducts rearwardly and away from the handlebar.

* * * * *